United States Patent Office 3,391,002
Patented July 2, 1968

3,391,002
PROCESS FOR MAKING IMITATION SOUR CREAM
Lawrence L. Little, Creve Coeur, Mo., assignor to The Battelle Development Corporation, Columbus, Ohio, a corporation of Delaware
No Drawing. Filed Jan. 15, 1965, Ser. No. 425,961
18 Claims. (Cl. 99—54)

ABSTRACT OF THE DISCLOSURE

Sour cream type products are prepared without butterfat or cultures by mixing an edible protein with an edible non-dairy lipoid, chemical emulsifiers, and whey separation inhibitors (gums), then pasteurizing and homogenizing, thereafter cooling and then adding an edible acid.

---

This invention relates to a process for preparing an imitation sour cream.

The increasing popularity of sour cream, sour half and half, and similar products flavored with bleu cheese, toasted onion, chive, and other flavors has created a need for a comparable imitation product which has body texture and flavor similar to those made with whole milk and cream. In the past, it was not possible to make such a synthetic product because in the absence of milk, and specifically milk sugar, the products could not be cultured to produce the desired lactic acid. In addition, no one was able to use animal fat (lard or tallow) or vegetable fat to replace butterfat without encountering poor body and texture. The imitation sour cream products attempted to date have had little resemblance to the authentic dairy product. Their flavor was either flat and lacking or else was very undesirable and unpalatable.

In the past, two types of imitation products have been envisioned. In one type, the butterfat is replaced with a nondairy fat. The nondairy fat is emulsified in a skim milk product so as to produce an imitation milk or cream containing the desired fat content of apprximately eight to twenty-five percent. This imitation cream would then be processed to produce an imitation sour cream type product.

In the other type of imitation product, no dairy ingredient would be used. A synthetic milk or cream would be produced by emulsifying the appropriate amount of a nondairy fat into an imitation skim milk so as to produce a completely synthetic imitation milk or cream containing no dairy ingredient. This imitation synthetic milk or cream would then be processed so as to produce an imitation sour cream type product.

Synthetic products of the first type are now on the market, but their acceptabiliy is distinctly limited because of undesirable flavor characteristic and, in many cases, a weak grainy and weepy body, due primarily to culturing processes. Products of the second type are not available commercially at the present time because lactose is necessary for fermentation with a lactic culture to produce the desired flavor and lactic acid. A truly synthetic product containing no dairy ingredient would contain no lactose.

One of the types of imitation sour cream described above will have great appeal to those who are allergic to butterfat or dairy proteins, or who for other dietary reasons must exclude or limit sour cream type products from their diet. An imitation sour cream would be much more economical than a comparable butterfat product. Low cost for such a product would have substantial market appeal.

By this invention, an imitation sour cream type product that has the body, texture and flavor characteristics of conventional dairy products has been discovered.

An object of this invention is to prepare an imitation sour cream type product in which the butterfat is replaced by a nondairy fat.

Another object is to prepare an imitation sour cream type product that contains no dairy ingredient.

Another object is to prepare an imitation sour cream type product which can be completely processed in substantially less than one hour.

Still another object is to prepare an imitation sour cream which is uniform in composition from day to day and avoids the variations inherent in products produced by culturing.

Other objects and advantages of this invention will be apparent from the following description thereof.

This invention in its broadest aspects contemplates producing an imitation sour cream product that does not use a butterfat type dairy product in the course of its preparation. In essence, what is done is to mix water or skim milk with an edible nondairy lipoid and heat to about 100° F. Then, edible proteins, carbohydrates, chemical emulsifiers, and whey separation inhibitors are added to the lipoid-liquid mixture. This mixture of all the above ingredients is then pasteurized, homogenized, cooled to about 33–95° F. and then an edible acid is added to obtain a pH of about 4.0 to 5.0. The product is then packaged and stored under refrigeration, like a butterfat type sour cream, until ready for consumption.

Though there are only six (6) basic particular types of ingredients, excluding water, necessary to compound this imitation sour cream, each type of ingredient is subject to a range of weight percent within the final product. In fact, more than one particular ingredient from a general group of ingredients may be used in the preparation procedure of the imitation sour cream. This specific feature is disclosed in the examples below which are typical of this invention.

Exclusive of water, the six basic types of ingredients required for compounding the novel product of this invention are:
(1) Lipoids
(2) Proteins
(3) Carbohydrates
(4) Chemical Emulsifiers
(5) Whey separation inhibitors
(6) Edible acids Optional ingredients used to a lesser degree include:
(1) Edible salts selected from the group of salts consisting of edible carbonates and edible bicarbonates for $CO_2$ source or mineral source (e.g., $Na_2CO_3$, $CaCo_3$, $NaHCO_3$, etc.)
(2) Salt (NaCl) for seasoning.
(3) Starter distillate, starter distillate constituents, or imitation flavor for dairy flavoring.
(4) Neutral salts such as sodium citrate, disodium phosphate, dicalcium phosphate, tetra sodium pyrophosphate, sodium hexa meta phosphate, etc.

The term "nondairy lipoid" as used in this invention is intended to include vegetable oils and fats, animal fats, or mixtures of the two types, or synthetic triglycerides. Examples of specific items that may be included by the term "nondairy lipoid" as used in this invention are (1) coconut oil, (2) corn oil, (3) cotton seed oil, (4) lard, (5) tallow, (6) partially hydrogenated cotton seed oil, (7) soy bean oil, (8) safflower oil, (9) whale oil, (10) sardine oil, (11) menhaden oil, (12) palm oil, (13) palm kernel oil, (14) cocoa butter, (15) peanut oil, (16) olive oil, (17) sunflower seed oil, (18) partially hydrogenated soy bean oil, (19) partially hydrogenated coconut oil, (20) partially hydrogenated corn oil, (21) partially hydrogenated peanut oil, (22) synthetic triglycerides, etc., or blends or two or more of the above which have been refined and deodorized.

The list of potentially suitable oils and fats is almost endless. The important criterion is that they be edible, suitably refined and deodorized so as to be bland in flavor and free of objectionable flavor and odor constituents. They may be unhydrogenated, partially hydrogenated, or completely hydrogenated so as to obtain the desired melting point and other physical characteristics. They may be bleached, acetylated, or rearranged, or otherwise processed or modified by any of the many processes and techniques utilized or available to those skilled in the art of processing nondairy fats and oils.

The amount of any of the above lipoid materials that may be used in accordance with this invention ranges from 8.0–25.0 percent by weight. When the nondairy lipoid is reduced below 8 percent by weight, the final product lacks the desired firm, heavy body as well as richness. On the other hand, when the products have over 25.0 percent by weight of the lipoid substance (as defined above) the product has a tendency to be greasy and unpalatable and has a propensity to be too firm of body.

Either water or nonfat skim milk may constitute the aqueous liquid mixed with the nondairy lipoid. The water can constitute up to 87.0 percent by weight of the final imitation sour cream; if skim milk used, the amount of skim milk solids that may be used is up to 13.0 percent by weight in the said sour cream product.

The whey separation inhibitor may be one of many recognized inhibitors. Also, two or more inhibitors may be used in combination. However, regardless of whether one or several inhibitors are used the total weight percent of inhibitors ranges from 0.05 percent to 0.50 percent. The whey inhibitors serve to prevent whey separation of the sour cream type product during storage.

Some of the whey inhibitors which are suitable for use in this invention are quar gum, locust bean gum, Danish agar, agar agar, karaya gum, cellulose gum, gelatin, acacia, pectin, carageenan, and carbodymethylcellulose (CMC).

The chemical emulsifiers used in this process promote the emulsification of the lipoid materials with the aqueous liquids.

Some emulsifiers which may be used in this process are lecithin and mono-diglycerides with iodine value (I.V.) of 20 or more in which the monoglyceride content is in the range of 30–100 percent and the rest is essentially di and tri glycerides. The amount used varies from 0.10 to 2.50 percent by weight.

The carbohydrates added are primarily to provide flavoring and bulk solids. As bulk solids, they also improve the body of the imitation sour cream product. From 0.25–6.0 weight percent is the amount of carbohydrates used in the formulation of this invention. Dextrose, corn syrup solids, dextrins, maltose, sucrose, lactose, tapioca flour, and starch are some of the carbohydrates that can be used in this invention.

The protein ingredient in this invention is added to improve the body and texture of the imitation sour cream. The amount used may vary from 0.5–5.0 weight percent. Included in the protein substances which may be used in this invention are caseinates, soya protein, vegetable protein from wheat, corn, cotton seed, sesame, etc., egg albumin, soya flour, wheat flour, gelatin, and other like materials. Caseinates include sodium caseinate, potassium caseinate, ammonium caseinate, and acid caseine.

Calcium carbonate or other edible carbonate or bicarbonate salts may be added with the above ingredients in the preparation of the imitation sour cream. When it is added, it serves as a source of carbon dioxide ($CO_2$) for the imitation sour cream. When an edible acid is added to the prepared ingredients in the preparation process, $CO_2$ is liberated by the reaction of the calcium carbonate with the edible acid.

The amount of edible carbonate or bicarbonate salt used may be up to 0.50 weight percent. At a level of 0.20 weight percent approximately 800 parts per million (p.p.m.) of $CO_2$ are captured in the final cream product. The $CO_2$ in the cream product bestows a characteristic "cultured flavor" to the imitation sour cream. This feature of this invention provides a flavor comparable to that of natural cultured sour cream.

Another optional ingredient which may be added prior to the pasteurization process is salt (NaCl) for seasoning purposes or for providing minerals to the final product. It may be eliminated or it may be added in amounts up to about 2.00 weight percent.

The pasteurizing procedure for this invention may be conducted over temperatures ranging from 145–300° F. with varying periods of time up to 30 minutes. A high temperature short time (HTST) period may be used as effectively as a moderate temperature for a longer period of time on the imitation sour cream mixture.

The homogenization of the pasteurized mixture may be done at the same pressures as is customary with conventional dairy products and with the same type of equipment.

After all the ingredients have been blended together, pasteurized, homogenized and cooled, the final step of adding an edible acid to this mixture is done. The acid is added in small increments to the vigorously agitated mixture until a pH of about 4.0 to 5.0 is obtained. The acid is added to the imitation sour cream product to contribute sharp or tart flavor and to improve the preservation qualities of the imitation sour cream. The imitation sour cream mixture is then packaged and stored under refrigeration like a cultured dairy type sour cream.

Some typical edible acids which may be used in the preparation of the imitation sour cream of this invention are lactic, citric, tartaric, adipic, fumaric, orthophosphoric, succinic, malic, gluconic, acetic, and hydrochloric acids.

Another option ingredient which may be added to the product to improve flavor is starter distillate, or starter distillate constituents, which are standard flavoring agents in the dairy industry. If used, the agent is added along with, or after, the acidification and gives the product a flavor similar to the butterfat type sour cream that is processed with bacterial cultures.

Some of the particular advantages of the process of this invention are that it provides:

(1) A sour cream product with no butterfat content
(2) A product which can be made with uniform quality
(3) A product which can be made very quickly (less than one hour) relative to the time required to prepare a sour cream product using bacterial growth, and
(4) A relatively low cost product compared to a butterfat type sour cream made with growth culture.

The following examples will illustrate the preparation of an imitation sour cream type product of the first type in which a nondairy fat is emulsified in skim milk.

Example No. 1

18.00 pounds partially hydrogenated vegetable fat with a melting point of approximately 100–200° F.

| | Pounds |
|---|---|
| Skim milk powder | 7.50 |
| Water | 74.50 |
| Total—18% fat | 100.00 |

Add the water to the batch tank, then add the skim milk powder and then the vegetable fat. Warm to approximately 110–120° F. and agitate until the vegetable fat is melted and well blended with the skim milk.

Then add 2.37 pounds of stabilizer, composed of the following formula:

| Ingredient | Formula, Percent | Concentration in the Product, Percent |
|---|---|---|
| Locust Bean Gum | 8.50 | 0.20 |
| Sodium Caseinate | 36.50 | 0.86 |
| Tapioca Flour | 35.00 | 0.83 |
| Salt | 6.50 | 0.15 |
| Lecithin | 13.50 | 0.33 |
| Total | 100.00 | 2.37 |

Slowly add the stabilizer to the well-agitated mix, and continue agitating until the stabilizer is dispersed, then pasteurize in the conventional manner. For vat pasteurization, use a temperature of approximately 145–195° F. for 0–30 minutes. For HTST pasteurization, use a temperature of 165–300° F. with a holding time of 0–60 seconds.

Homogenize at a temperature of 130° F. or higher and at a pressure of approximately 500–3000 pounds.

Cool to approximately 35–95° F.

Add a solution of lactic acid containing approximately 30 percent lactic acid by volume and 70 percent water. This is used at the rate of 2 ounces per gallon. Agitate the product while the acid solution is being added, and continue agitating until the coagulation is broken up and the product is smooth and free of lumps. An excellent way to mix the product is to pump it with a positive pump with about 50–150 pounds head pressure. Also, homogenizing with light pressure of 50–2000 pounds of pressure is very effective.

If party dip flavors are to be added, they may be stirred in the product at this time or mixed with the cream just before the acid solution is added.

The product is then packaged and stored under refrigeration. It will have a firm body and a bland, mildly acid flavor.

Example No. 2

| | Pounds |
|---|---|
| Coconut oil (M.P. 76–110° F.) | 15.00 |
| Fluid skim milk | 84.00 |
| Locust bean gum | 0.25 |
| Mono-diglycerides I.V. 25 or above | 0.75 |
| Total | 100.00 |

Heat to 150–195° F. Hold for 0–30 minutes. Homogenize by any suitable means. Cool to 35–95° F. Add about 2 ounces of approximately 30 percent solution of citric acid, sufficient to reduce the pH of the product to approximately 4.20–4.60. Mix thoroughly, package, and store under refrigeration.

Suitable flavors may be aded such as starter distillate, other volatile constituents of cultured products, or dip flavors such as bleu cheese, tosated onion, chive, etc.

Example No. 3

| | Pounds |
|---|---|
| Partially hydrogenated lard | 10.00 |
| Fluid skim milk | 89.00 |
| Guar gum | 0.20 |
| High mono content (50–95 percent) Monoglyceride, I.V. 20 or above | 0.80 |
| Total | 100.00 |

HTST pasteurize at 161° F. or higher. Homogenize at a pressure of 500–3000 pounds. Add approximately one ounce per gallon of 70 percent lactic acid solution. Mix thoroughly, package under partial vacuum of 5–15 inches and store under refrigeration. This product will have excellent keeping quality and may be displayed in the store without refrigeration.

The above may be flavored as desired, utilizing starter distillate or other volatile flavor constituents and/or it may be flavored with the conventional type dip flavors such as bleu cheese, toasted onion, chives, etc.

Example No. 4

| | Pounds |
|---|---|
| White Crest shortening (Durkee Famous Foods) | 18.00 |
| Skim milk powder | 7.50 |
| Water | 74.50 |
| Total—18% fat | 100.00 |

Pasteurize by HTST at a temperature of 161° F. or higher. Homogenize at a pressure of approximately 500–3000 pounds, at a temperature of 135° F. or higher. Cool to approximately 100° F. or lower and add:

| | Pounds |
|---|---|
| Locust bean gum | 0.25 |
| Calcium carbonate | 0.25 |
| Sodium caseinate | 0.87 |
| Mono-diglyceride, I.V. 20 or above | 1.00 |

Add color, salt and flavoring as desired. Agitate until thoroughly dissolved. Heat to 145–195° F. Hold for 0 to 30 minutes. Cool to about 33–95° F. and add 2 ounces per gallon of a solution containing approximately 45 percent citric acid. Mix thoroughly, package and store under refrigeration.

NONDAIRY IMITATION SOUR CREAM

This type of imitation sour cream differs from the previous one in that no dairy ingredient is used in the product. To accomplish this objective in stepwise procedure, a synthetic skim milk is made from protein, carbohydrates, and minerals and to this is added a nondairy fat. The fat is emulsified in the synthetic skim milk by homogenization or other suitable means. Stabilizing and emulsifying agents are then added. This combination of ingredients is then pasteurized to facilitate incorporation. It is then cooled and acidified as described previously.

Example No. 5

| | Pounds |
|---|---|
| Synthetic skim milk: | |
| Water | 80.00 |
| Sodium caseinate | 2.25 |
| Tapioca flour | 2.50 |
| Dextrose | 4.00 |
| Mono-glyceride, I.V. 20 or over | 1.00 |
| Guar gum | 0.25 |
| Total | 90.00 |

Add water to the mix-up tank, then pre-mix the other ingredients and slowly add to the vat with vigorous agitation. Continue the agitation until the solids are uniformly dispersed and free of lumps. Warm to approximately 90–100° F. and add: 10.00 pounds coconut oil (76° F.). Agitate until the coconut oil is melted and dispersed throughout the product.

Add salt and color as desired. Heat to 143–195° F. Hold for 0–30 minutes. Homogenize by any suitable means. Cool to approximately 35–95° F. Add about 2 ounces per gallon of 0.28 percent solution of lactic acid, sufficient to reduce the pH to 4.00–4.75. Mix thoroughly. Package and store under refrigeration.

Example No. 6

Prepare a synthetic skim milk by adding the following ingredients to the mix-up tank:

| | Pounds |
|---|---|
| Water | 70.00 |
| Sodium caseinate | 2.00 |
| Corn syrup solids, 42 D.E. (Dextrose Equivalent) | 5.00 |
| Tapioca flour | 2.25 |
| Calcium carbonate | 0.25 |
| Locust bean gum | 0.25 |
| Lecithin | 0.25 |
| Total | 80.00 |

Add the water to the batch tank. Premix the solid ingredients and slowly add to the batch tank with vigorous agitation. Continue agitating until the dry ingredients are thoroughly dispersed and free from lumps.

Add 20.00 pounds White Crest shortening (Durkee Famous Foods).

Warm to approximately 100–110° F. with agitation until the White Crest is melted and dispersed throughout the mix. Add color, salt, and flavoring as desired. Pasteurize through HTST unit at 160–300° F. for 0–30 seconds.

Homogenize at a temperature of 130° F. or higher at a pressure of approximately 500 pounds or more. Cool to 33–95° F. and add about 2 ounces per gallon of a 40 percent solution of citric acid, sufficient to neutralize most of the calcium carbonate and release the $CO_2$ in the product, and reduce the pH to approximately 4.0–4.90. Mix thoroughly, package and store under refrigeration.

Example No. 7

| | Pounds |
|---|---|
| Water | 76.25 |
| Danish agar (Furcellaran) | 0.25 |
| Isolated soya protein | 1.50 |
| Potato starch | 2.50 |
| Corn syrup solids, 26 D.E. | 3.50 |
| Mono-diglycerides, I.V. 20 or over | 1.00 |
| Total | 85.00 |

Add the water to the batch tank and slowly add the other ingredients (pre-mixed) with vigorous agitation. When the solid ingredients are thoroughly dispersed and free of lumps, add: 15.00 pounds safflower oil. Pasteurize, homogenize, and cool to approximately 35–95° F.

Add 2.5% of a dehydrated party dip flavor, containing dehydrated onions, dehydrated parsley, hydrolyzed vegetable protein, salt, etc. and mix thoroughly. Add about 1½ ounces per gallon of an acid solution containing approximately 50% citric acid and 25% starter distillate in water, sufficient to reduce the pH to about 4.00–4.90. Mix thoroughly, package and store under refrigeration.

Example No. 8

Add the following ingredients to the batch tank in the order named, with vigorous agitation to avoid lumping of the dry ingredients:

| | Pounds |
|---|---|
| Water | 72.00 |
| Corn oil | 18.00 |
| Locust bean gum | 0.25 |
| Soya flour | 4.25 |
| Tapioca starch | 2.00 |
| Dextrose | 3.00 |
| Lecithin | 0.25 |
| Salt | 0.25 |
| Total | 100.00 |

Process as described in Example No. 7. Set with about 2 ounces per gallon of an acid solution containing 30% citric acid, sufficient to reduce the pH to approximately 4.00–4.90. Add color and flavoring as desired. Mix thoroughly, package and store under refrigeration.

EXAMPLE NO. 9

| | Pounds |
|---|---|
| Water | 74.00 |
| Partially hydrogenated vegetable oil (M.P. 100–115° F.) | 15.00 |
| Danish agar | 0.15 |
| Locust bean gum | 0.25 |
| Sodium caseinate | 2.00 |
| Corn starch | 2.00 |
| Corn syrup solids, 42 D.E. (Dextrose Equivalents) | 4.00 |
| Hydrolyzed vegetable protein | 0.50 |
| Salt | 0.50 |
| Calcium carbonate | 0.25 |
| Mono diglycerides, I.V. 20 or over | 1.35 |
| Total | 100.00 |

Add ingredients to batch tank and mix thoroughly. Heat to about 145–195° F. and homogenize by sonic homogenization. Add about 2 ounces per gallon of a 35% solution of citric acid and 5% acetic acid, sufficient to reduce the pH to 4.00–4.70 and mix thoroughly. Package at pasteurizing temperature under vacuum pressure of 5–11 inches. The product can then be stored at room temperature for periods of 3 to 6 months.

EXAMPLE NO. 10

| | Pounds |
|---|---|
| Water | 73.00 |
| Deodorized lard | 18.00 |
| Gelatin (2.25 bloom) | 0.50 |
| Sodium caseinate | 2.00 |
| Tapioca flour | 2.50 |
| Dextrose | 3.00 |
| Mono diglycerides, I.V. 20 or more | 1.00 |
| Total | 100.00 |

Process as described in Example No. 7.

Cool to approximately 35–95° F. Add about 0.50% fumaric acid powder. Agitate vigorously until the fumaric acid powder is thoroughly dispersed. Add salt, color, and flavoring as desired. Continue agitating for 5–30 minutes, then package and store under refrigeration.

The most important feature of the process of this invention is formulating a composition that can be "set" by adding the desired acid to the product rather than developing the flavor by culturing as is done with butterfat-type dairy sour cream. Because no reliance need be placed on bacterial growth for establishing a flavor in the imitation cream product, and because fixed quantities of uniform ingredients can be used in compounding this imitation sour cream, uniformity of quality, is certain.

Not only is uniformity of quality a certainty by this invention, but there is also a substantial saving in preparation time because no bacterial incubation and growth period is required. Where culture processes take hours for preparation of sour cream, this process can be accomplished in less than one hour.

In the preparation of this imitation sour cream great variation can be made in the ingredients employed in order to achieve a different characteristic and properties of body, texture, and subtle flavors without departing from the spirit of this invention. The foregoing description is for purposes of illustration, and it is intended that the invention be limited only by the appended claims.

What is claimed is:

1. A process for making imitation sour cream comprising the steps of:

(a) adding to an aqueous liquid containing 0.5 to 5.0 percent, by weight, of an edible protein and 0.25 to 6.0 percent, by weight, of carbohydrates the following:
  (1) from 8 to 25 percent, by weight, of an edible non-dairy lipoid material,
  (2) from 0.10 to 2.50 percent, by weight, of edible chemical emulsifiers,
  (3) from 0.05 to 0.50 percent, by weight, of at least one material selected from the group of guar gum, locust bean gum, Danish agar, agar agar, karaya gum, gelatin, acacia, a cargeenan, and carboxy methyl-cellulose;
(b) pasteurizing and homogenizing the liquid and added ingredient and thereafter:
(c) cooling said mixture to a temperature of about 33° to 95° F.; and
(d) adding an edible acid to the cooled pasteurized and homogenized mixture with agitation.

2. The process of claim 1 wherein said aqueous solution consists of water to which said edible protein and carbohydrates have been added.

3. The process of claim 1 wherein the edible nondairy lipoid material is selected from the group consisting of coconut oil, synthetic triglycerides, corn oil, cotton seed oil, soy bean oil, peanut oil, safflower oil, whale oil, sardine oil, menhaden oil, lard, tallow, partially hydrogenated cotton seed oil, partially hydrogenated soy bean oil, partially hydrogenated peanut oil, partially hydrogenated corn oil, and partially hydrogenated coconut oil.

4. The process of claim 1 wherein the edible protein is selected from the group consisting of sodium caseinate, potassium caseinate, ammonium caseinate, acid caseinate, soya protein, vegetable protein, egg albumin, soya flour, wheat flour, and gelatin.

5. The process of claim 1, wherein the carbohydrate is selected from the group consisting of dextrose, corn syrup solids, dextrin, lactose, maltose, sucrose, starch and tapioca flour.

6. The process of claim 1 wherein the edible chemical emulsifiers are selected from the group consisting of lecithin and monoglycerides and diglycerides with an iodine value of at least 20.

7. The process of claim 1 wherein the pasteurizing is conducted at a temperature of 145–300° F. for a period of up to 30 minutes.

8. The process of claim 1 wherein the edible acid added is selected from the group of acids consisting of lactic, citric, tartaric, adipic, fumaric, orthophosphoric, pyrophosphoric, succinic, malic, gluconic, acetic, and hydrochloric.

9. The process of claim 1 wherein the edible acid is added to the cooled pasteurized-homogenized mixture until a pH is obtained ranging from 4.0–5.0.

10. The process of claim 1 wherein up to about 0.05 to 0.50 percent by weight of an edible salt selected from the group of salts consisting of edible carbonates and edible bicarbohydrates is added to the processed ingredients before the addition of an edible acid.

11. A process for making imitation sour cream comprising the steps of:
  (a) adding to an aqueous liquid selected from the group consisting of water and skim milk, an edible non-diary lipoid, material selected from the group consisting of synthetic triglycerides, coconut oil, corn oil, cotton seed oil, soy bean oil, peanut oil, safflower oil, whale oil, sardine oil, menhaden oil, lard, tallow, partial hydrogenated cotton seed oil, partial hydrogenated soy bean oil, partially hydrogenated peanut oil, partially hydrogenated corn oil, and partial hydrogenated coconut oil, until said lipoid material comprises 8 to 25 percent by weight;
  (b) warming the said aqueous liquid and lipoid material mixture to about 100° F. while agitating same;
  (c) adding 0.5–5.0 percent by weight of edible protein to the warmed mixture while vigorously agitating said mixture;
  (d) adding 0.25 to 6.0 percent by weight of carbohydrates to the warmed mixture while vigorously agitating said mixture;
  (e) adding 0.10 to 2.50 percent by weight of edible chemical emulsifiers to the mixture while vigorously agitating said mixture;
  (f) adding 0.05 to 0.50 percent by weight of edible whey separation inhibitors to the mixture while vigorously agitating said mixture, said whey separators being at least one material selected from the group of guar gum, locust bean gum, Danish agar, agar agar, karaya gum, gelatin, acacia, pectin, carageenan, and carboxymethyl-cellulose (CMC);
  (g) pasteurizing the mixture and the added ingredients;
  (h) homogenizing the pasteurized material;
  (i) cooling the homogenized-pasteurized material to a temperature of about 33–95° F.; and
  (j) adding an edible acid selected from the group of acids consisting of lactic, citric, tartaric, adipic, fumaric, orthophosphoric, pyrophosphoric, and hydrochloric, to the said cooled pasteurized-homogenized mixture while vigorously agitating said mixing until a pH is obtained ranging from 4.0–5.0.

12. A process for making imitation sour cream comprising the steps of:
  (a) adding to an aqueous liquid selected from the group consisting of water and skim milk, an edible non-dairy lipoid, material selected from the group consisting of synthetic triglycerides, coconut oil, corn oil, cotton seed oil, soy bean oil, peanut oil, safflower oil, whale oil, sardine oil, menhaden oil, partially hydrogenated corn and peanut oils, lard, tallow, partial hydrogenated cotton seed oil, partial hydrogenated soy bean oil, and partially hydrogenated coconut oil, until said lipoid material comprises 8 to 25 percent by weight;
  (b) warming the said aqueous liquid and lipoid material mixture to about 100° F. while vigorously agitating same;
  (c) adding 0.5–5.0 percent by weight of edible protein selected from the group consisting of sodium caseinate, potassium caseinate, ammonium caseinate, soya protein, vegetable protein, egg albumin, soya flour, wheat flour, and gelatin, to the warmed mixture while vigorously agitating said mixture;
  (d) adding 0.25–6.0 percent by weight of carbohydrates to the warmed mixture while vigorously agitating said mixture;
  (e) adding 0.10 to 2.50 percent by weight of edible chemical emulsifiers to the mixture while vigorously agitating said mixture;
  (f) adding 0.05 to 0.50 percent by weight of edible whey separation inhibitors to the mixture while vigorously agitating said mixture, said whey separators being at least one material selected from the group of guar gum, locust bean gum, Danish agar, agar agar, karaya gum, gelatin, acacia, pectin, carageenan, and carboxymethyl-cellulose (CMC);
  (g) pasteurizing the mixture and the added ingredients;
  (h) homogenizing the pasteurized material;
  (i) cooling the homogenized-pasteurized material to a temperature of about 33–95° F.; and
  (j) adding an edible acid to the said cooled pasteurized-homogenized mixture while vigorously agitating said mixture.

13. A process for making imitation sour cream comprising the steps of:
  (a) adding to an aqueous liquid selected from the group consisting of water and skim milk, an edible non-dairy lipoid, material selected from the group consisting of synthetic triglycerides, coconut oil, corn oil, cotton seed oil, soy bean oil, safflower oil, whale oil, sardine oil, menhaden oil, partially hydrogenated corn and peanut oils, lard, tallow, partially hydrogenated cotton seed oil, partially hydrogenated soy bean oil, and partially hydrogenated coconut oil, until said lipoid material comprises 8 to 25 percent by weight;

(b) warming the said aqueous liquid and lipoid material mixture to about 100° F. while vigorously agitating same;

(c) adding 0.5–5.0 percent by weight of edible protein selected from the group consisting of sodium caseinate, potassium caseinate, ammonium caseinate, acid caseinate, soya protein, vegetable protein, egg albumin, soya flour, wheat flour, and gelatin, to the warmed mixture while vigorously agitating said mixture;

(d) adding 0.25–6.0 percent by weight of carbohydrates to the warmed mixture while vigorously agitating said mixture;

(e) adding 0.10 to 2.50 percent by weight of edible chemical emulsifiers to the mixture while vigorously agitating said mixture;

(f) adding 0.05 to 0.50 percent by weight of edible whey separation inhibitors to the mixture while vigorously agitating said mixture, said whey separators being at least one material selected from the group of guar gum, locust bean gum, Danish agar, agar agar, karaya gum, gelatin, acacia, pectin, carageenan, and carboxymethyl-cellulose (CMC);

(g) pasteurizing the mixture and the added ingredients at a temperature of 145–300° F.;

(h) homogenizing the pasteurized material;

(i) cooling the homogenized-pasteurized material to a temperature of about 33–95° F.; and (j) adding edible acid selected from the group of acids consisting of lactic, citric, tartaric, adipic, fumaric, orthophosphoric, pyrophosphoric succinic, malic, gluconic, acetic, and hydrochloric, to the said cooled pasteurized-homogenized mixture while vigorously agitating said mixture until a pH is obtained ranging from 4.0–5.0.

14. A process for making imitation sour cream comprising the steps of:

(a) adding to an aqueous liquid selected from the group consisting of water and skim milk, an edible non-dairy lipoid, material selected from the group consisting of synthetic triglycerides, coconut oil, corn oil, cotton seed oil, soy bean oil, peanut oil, safflower oil, whale oil, sardine oil, menhaden oil, partially hydrogenated corn and peanut oils, lard, tallow, partial hydrogenated cotton seed oil, partial hydrogenated soy bean oil, and partially hydrogenated coconut oil, until said lipoid material comprises 8 to 25 percent by weight;

(b) warming the said aqueous liquid and lipoid material mixture to about 100° F. while vigorously agitating same;

(c) adding 0.5–5.0 percent by weight of edible protein selected from the group consisting of sodium caseinate, potassium caseinate, ammonium caseinate, acid caseinate, soya protein, vegetable protein, egg albumin, soya flour, wheat flour, and gelatin, to the warmed mixture while vigorously agitating said mixture;

(d) adding 0.25–6.0 percent by weight of carbohydrates selected from the group consisting of dextrose, corn syrup, solids, dextrins, lactose, maltose, sucrose, starch, and tapioca flour to the warmed mixture while vigorously agitating said mixture;

(e) adding 0.10 to 2.50 percent by weight of edible chemical emulsifiers to the mixture while vigorously agitating said mixture;

(f) adding 0.05 to 0.50 percent by weight of edible whey separation inhibitors to the mixture while vigorously agitating said mixture, said whey separators being at least one material selected from the group of guar gum, locust bean gum, Danish agar, agar agar, karaya gum, gelatin, acacia, pectin, carageenan, and carboxymethyl-cellulose (CMC);

(g) pasteurizing the mixture and the added ingredients;

(h) homogenizing the pasteurized material;

(i) cooling the homogenized-pasteurized material to a temperature of about 33–95° F.; and (j) adding an edible acid to the said cooled pasteurized-homogenized mixture while vigorously agitating said mixture.

15. A process for making imitation sour cream comprising the steps of:

(a) adding to an aqueous liquid selected from the group consisting of water and skim milk, an edible non-dairy lipoid, material selected from the group consisting of synthetic triglycerides, coconut oil, corn oil, cotton seed oil, soy bean oil, peanut oil, safflower oil, whale oil, sardine oil, menhaden oil, partially hydrogenated corn and peanut oils, lard, tallow, partially hydrogenated cotton seed oil, partially hydrogenated soy bean oil, and partially hydrogenated coconut oil, until said lipoid material comprises 8 to 25 percent by weight;

(b) warming the said aqueous liquid and lipoid material to about 100° F. while vigorously agitating same;

(c) adding 0.5–5.0 percent by weight of edible protein selected from the group consisting of sodium caseinate, potassium caseinate, ammonium caseinate, acid caseinate, soya protein, vegetable protein, egg albumin, soya flour, wheat flour and gelatin to the warmed mixture while vigorously agitating said mixture;

(d) adding 0.25–6.0 percent by weight of carbohydrates selected from the group consisting of dextrose, corn syrup solids, dextrins, lactose, maltose, sucrose, starch, and tapioca flour, to the warmed mixture while vigorously agitating said mixture;

(e) adding 0.10–2.50 percent by weight of edible chemical emulsifiers selected from the group consisting of lecithin, and monoglycerides and diglycerides with an iodine value (I.V.) of at least 20, to the mixture while vigorously agitating said mixture;

(f) adding 0.05 to 0.50 percent by weight of edible whey separation inhibitors selected from the group consisting of guar gum, locust bean gum, Danish agar, agar agar, karaya gum, gelatin, acacia, pectin, caragecnan, and carboxymethyl-cellulose (CMC), to the mixture while vigorously agitating said mixture;

(g) pasteurizing the mixture and the added ingredients;

(h) homogenizing the pasteurized material;

(i) cooling the homogenized-pasteurized material to a temperature of about 33–95° F.; and (j) adding an edible acid to the said cooled pasteurized-homogenized mixture while vigorously agitating said mixture.

16. A process for making imitation sour cream comprising the steps of:

(a) adding to an aqueous liquid selected from the group consisting of water and skim milk, an edible non-dairy lipoid, material selected from the group consisting of synthetic triglycerides, coconut oil, corn oil, cotton seed oil, soy bean oil, peanut oil, safflower oil, whale oil, sardine oil, menhaden oil, partially hydrogenated corn and peanut oils, lard, tallow, partially hydrogenated cotton seed oil, partially hydrogenated soy bean oil, and partially hydrogenated coconut oil, until said lipoid material comprises 8 to 25 percent by weight;

(b) warming the said aqueous liquid and lipoid material mixture to about 100° F. while vigorously agitating same;

(c) adding 0.5–5.0 percent by weight of edible protein selected from the group consisting of sodium caseinate, potassium caseinate, ammonium caseinate, acid caseinate, soya protein, vegetable protein, egg albumin, soya flour, wheat flour, and gelatin, to the warmed mixture while vigorously agitating said mixture;

(d) adding 0.25–6.0 percent of carbohydrates selected from the group consisting of dextrose, corn syrup, solids, dextrins, lactose, maltose, sucrose, starch, and tapioca flour to the warmed mixture while vigorously agitating said mixture;

(e) adding 0.10 to 2.50 percent by weight of edible chemical emulsifiers to the mixture while vigorously agitating said mixture;

(f) adding 0.05 to 0.50 percent by weight of edible whey separation inhibitors to the mixture while vigorously agitating said mixture, said whey separators being at least one material selected from the group of guar gum, locust bean gum, Danish agar, agar agar, karaya gum, gelatin, acacia, pectin, carageenan, and carboxymethyl-cellulose (CMC);

(g) pasteurizing the mixture and the added ingredients;

(h) homogenizing the pasteurized material;

(i) cooling the homogenized-pasteurized material to a temperature of about 33–95° F.; and (j) adding an edible acid selected from the group of acids consisting of lactic, citric, tartaric, adipic, fumaric, orthophosphoric, pyrophosphoric succinic, malic, gluconic, acetic, and hydrochloric, to the said cooled pasteurized-homogenized mixture while vigorously agitating said mixture until a pH is obtained ranging from 4.0–5.0.

17. A process for making imitation sour cream comprising the steps of:

(a) adding to an aqueous liquid selected from the group consisting of water and skim milk, an edible nondairy lipoid material selected from the group consisting of synthetic triglycerides, coconut oil, corn oil, cotton seed oil, soy bean oil, peanut oil, safflower oil, whale oil, sardine oil, menhaden oil, partially hydrogenated corn and peanut oils, lard, tallow, partially hydrogenated cotton seed oil, partially hydrogenated soy bean oil, and partially hydrogenated coconut oil, until said lipoid material comprises 8 to 25 percent by weight;

(b) warming the said aqueous liquid and lipoid material mixture to about 100° F. while vigorously agitating same;

(c) adding 0.5–5.0 percent by weight of edible protein selected from the group consisting of sodium caseinate, potassium caseinate, ammonium caseinate, acid caseinate, soya protein, vegetable protein, egg albumin, soya flour, wheat flour, and gelatin, to the warmed mixture while vigorously agitating said mixture;

(d) adding 0.25–6.0 percent by weight of carbohydrates selected from the group consisting of dextrose, corn syrup, solids, dextrins, lactose, maltose, sucrose, starch and tapioca flour to the warmed mixture while vigorously agitating said mixture;

(e) adding 0.10 to 2.50 percent by weight of edible chemical emulsifiers selected from the group consisting of lecithin, and monoglycerides and diglycerides with an iodine value (I.V.) of at least 20, to the mixture while vigorously agitating said mixture;

(f) adding 0.05 to 0.50 percent by weight of edible whey separation inhibitors selected from the group consisting of guar gum, locust bean gum, Danish agar, agar agar, karaya gum, cellulose gum, gelatin, acacia, pectin, carageenan, and carboxymethylcellulose (CMC), to the mixture while vigorously agitating said mixture;

(g) pasteurizing the mixture and the added ingredients at a temperature of 145–300° F. for a period of up to 30 minutes;

(h) homogenizing the pasteurized material;

(i) cooling the homogenized-pasteurized material to a temperature of about 33–95° F.;

(j) adding about 0.05 to 0.50 percent by weight of an edible salt selected from the group of salts consisting of edible carbonates and edible bicarbonates; and (k) adding an edible acid selected from the group of acids consisting of lactic, citric, tartaric, adipic, fumaric, orthophosphoric, pyrophosphoric, succinic, malic, gluconic, acetic and hydrochloric, to the said cooled pasteurized-homogenized mixture, while vigorously agitating said mixture until a pH ranging from 4.0 to 5.0 is obtained.

18. The process of claim 1 wherein said aqueous solution consists essentially of skim milk.

References Cited

UNITED STATES PATENTS

| | | | |
|---|---|---|---|
| 607,362 | 7/1898 | Graeff | 99—79 X |
| 2,217,699 | 10/1940 | Musher | 99—144 |
| 2,719,793 | 10/1955 | Page et al. | 99—59 |
| 2,890,959 | 6/1959 | Phillips | 99—123 |
| 2,892,721 | 6/1959 | Nelson | 99—118 |
| 3,025,165 | 3/1962 | Metzger | 99—59 |
| 3,189,464 | 6/1965 | Heinemann | 99—116 |

LIONEL M. SHAPIRO, *Primary Examiner.*